United States Patent Office 3,654,245
Patented Apr. 4, 1972

3,654,245
FLUORINE-CONTAINING POLYMERS
Yutaka Kometani, Sanda-shi, and Masayoshi Tatemoto, Takatsuki-shi, Japan, assignors to Daikin Kogyo Kabushiki Kaisha, Osaka-shi, Japan
No Drawing. Continuation of application Ser. No. 477,012, Aug. 3, 1965. This application Nov. 25, 1968, Ser. No. 778,856
Claims priority, application Japan, Aug. 7, 1964, 39/45,124
Int. Cl. C08f 3/42, 3/62, 3/74
U.S. Cl. 260—80          17 Claims

ABSTRACT OF THE DISCLOSURE

Polymers made from unsaturated aliphatic polyfluorocarboxylic acids having a double bond at an ω position and 4–19 carbon atoms, and derivatives of such acids.

---

This application is a continuation of application Ser. No. 477,012, filed Aug. 3, 1965, and now abandoned.

The present invention relates to fluorine-containing polymers, particularly to polymers obtained by polymerizing unsaturated polyfluorocarboxylic acids having a double bond at an ω-position therein.

While the conventional fluorine-containing polymers generally have great stability to heat, light and chemicals and good electrical properties and are useful industrial plastics, a few imperfections therein have been inevitable.

Polytetrafluoroethylene, for instance, is difficult to mold, and molded objects made therefrom are liable to cold-flow. Copolymers of tetrafluoroethylene and hexafluoropropylene can be more easily molded than tetrafluoroethylene homopolymers, but the heat-resistance of such copolymers, however, is lower than that of tetrafluorethylene homopolymers, and the mechanical properties of articles molded therefrom, such as tensile strength, are inferior to the mechanical properties of articles made from chlorotrifluoroethylene homopolymers. Further all those known fluorine-containing resins can not be molded by a casting method, thus usually requiring troublesome molding processes.

The object of the invention is to provide fluorine-containing polymers in which all such imperfections as stated above have been improved. Another object of the invention is to provide fluorine-containing polymers which are capable of being readily crosslinked in the presence or absence of a cross-linking agent. A further object of the invention is to provide fluorine-containing polymers which allow for a markedly simplified molding operation therewith, even permitting a casting method. Another object of the invention is to provide fluorine-containing polymers which are capable of producing excellent moldings which have high heat resistance and mechanical properties including resistance to cold-flow by virtue of said cross-linking.

These and other specific features of the present invention will be apparent from the description to follow hereinafter.

The new polymers according to the invention comprise homopolymers of unsaturated aliphatic polyfluorocarboxylic acids having 3–19 carbon atoms, having a double bond at an ω-position, or derivatives thereof; copolymers of more than 2 species of said polyfluorocarboxylic acids and derivatives thereof; copolymers of at least one species of said polyfluorocarboxylic acids and derivatives thereof and at least one species of other co-polymerizable compounds.

Polyfluorocarboxylic acids and derivatives thereof employed in the present invention as monomers comprise unsaturated aliphatic polyfluorocarboxylic acids with 3–19 carbon atoms, having at one end of its carbon chain a carboxyl group and at the other end of such carbon chain a double bond, and various derivatives of such acids obtained by the reaction with suitable reactants of said carboxyl groups, e.g., esters, metallic salts, amides, nitriles, among which the most desirable compounds are the perfluorocarboxylic acids and derivatives thereof expressed by the following general formula:

$$CF_2=CF(CF_2)_nA \qquad (I)$$

wherein A is $COOH$, $COOR$, $COOR_f$, $COOM$, $CONH_2$ or $CN$, and R being an alkyl group having 1–3 carbon atoms; $R_f$ being a polyfluoroalkyl group having 1–3 carbon atoms; M being an alkali metal or alkaline earth metal and $n$ is an integer, 0–16 inclusive.

For representative perfluorocarboxylic acids there can be cited perfluoroacrylic acid ($CF_2=CFCOOH$), perfluoro-3-butenoic acid ($CF_2=CF\cdot CF_2COOH$) and perfluoro-5-hexenoic acid ($CF_2=CF(CF_2)_3OOH$), etc.

Such polyfluorocarboxylic acids may be synthesized by dehalogenation of an aliphatic dihaloperfluoro-carboxylic acid having at one end of its carbon chain a carboxyl group or an organic group derived by a reaction of said carbonyl group, and at the other end of its carbon chain the group expressed by a formula, $CF_2XCFX'$— (X and X' being a halogen other than fluorine; particularly, chlorine and bromine).

In order to simplify the description, the synthesis of the perfluorocarboxylic acids and derivatives thereof as shown by the above general Formula I can be explained as follows:

Said synthesis can be carried out by removing halogen atoms expressed as X and X' from compounds expressed by the general formula:

$$CF_2XCFX'(CF_2)_nA \qquad (II)$$

wherein X, X', A and $n$ are respectively the same as above. The dehalogenation can be done in a conventional manner, employing dehalogenating agents such as zinc dust, sodium, magnesium, palladium, iron, etc. The reaction takes place in the presence of suitable solvents such as alcohols, ketones, ethers, water, acids and acid anhydrides.

The desirable dehalogenating agent is zinc dust, and ketones such as acetone, methyl ethyl ketone, methyl isobutyl ketone and ethers such as diethyl ether, diisopropyl ether, dioxane, etc. are suitable solvents.

The starting material as expressed by the above general Formula II was synthesized in the following sequence:

$CF_2XCFX'I$ (X being chlorine or bromine, and X' being the same as above), which was an addition product of iodomonohalogenide XI and $CF_2=CFX$ was telomerized with tetrafluoroethylene to produce a telomer having the general formula: $CF_2XCFX'(C_2F_4)_mI$ (X and X' being same as above, and $m$ an integer, 1–8). Either by oxidizing said telomer with fuming sulfuric acid and hydrolyzing the resultant acid fluoride, or by oxidizing the compound, $CF_2XCFX'(C_2F_4)_mCH=CHI$ (X and X' being same as above) which was obtained by the reaction of said telomer with acetylene, the desired II compound was synthesized.

The above mentioned method of synthesizing the starting materials and the monomers of the invention, i.e. unsaturated aliphatic polyfluorocarboxylic acids, is only illustrative and does not limit the scope of present invention.

The unsaturated aliphatic polyfluorocarboxylic acids and their derivatives have a markedly high order of polymerizability and reactivity on account of the double bond at ω-position, so that these compounds can be easily polymerized individually or in admixture with each other or with other copolymerizable substances, producing the desired homopolymers or copolymers. The copolymerizable substances include all materials that can be copolymerized with said carboxylic acids, such as tetrafluoroethylene, trifluoromonochloroethylene, trifluoroethylene, vinylidene fluoride, 1,1-difluoro-2,2-dichloroethylene, 1,1-difluoro-2-chloroethylene, hexafluoropropylene, 1,1,1,3,3-pentafluoropropylene, octafluoroisobutylene (fluoroolefins), ethylene, vinyl chloride (olefins), trifluoronitrosomethane, perfluoronitrosoethane (nitroso compounds), alkyl vinyl ethers, unsaturated epoxide, etc.

Specific copolymerizable monomer combinations include, for instance, (1) tetrafluoroethylene and fluorine-containing carboxylic acid; (2) tetrafluoroethylene, vinylidene fluoride and fluorine-containing carboxylic acid, (3) tetrafluoroethylene, hexafluoropropylene and fluorine-containing carboxylic acid, (4) vinylidene fluoride, hexafluoropropylene and fluorine-containing carboxylic acid, (5) trifluoronitrosomethane, tetrafluoroethylene and fluorine-containing carboxylic acid, etc. Besides the above mentioned combinations various other combinations of monomers can be copolymerized with the fluorene-containing carboxylic acids and derivatives thereof of this invention, thus producing various copolymers having different properties.

For the polymerization any method may be adopted, such as emulsion polymerization, suspension polymerization, or block polymerization, and the kind and amount of polymerization initiator and other additives, pressure, temperature, etc. necessary for the polymerization can be selected from a wide range of conditions suitable for the polymerization of conventional fluoroolefins, depending on the kind of monomers employed. The polymerization can also be carried out under irradiation by ionizing radiation.

The fluorine-containing polymers of this invention generally have the following characteristic properties:

By heat-treatment of these polymers, there occurs a cross-linking reaction whereby their melting point and melt viscosity values experience a marked increase.

The cross-linking in this case should preferably be carried out in an inert gas such as nitrogen gas or under vacuum, as the cross-linking in air is liable to deteriorate the resultant polymer. Since the polymers have, as a side chain, a carboxyl group or other reactive group derived therefrom, the cross-linking reaction takes place more easily by heating the polymer with polyfunctional compounds such as epoxy compounds, diamines, etc. Cross-linking with other reactive polymers is also possible, and thus, cross-linked polymers having a specific property can be obtained. For instance, fluoro-rubbers, particularly nitrosorubber which was difficult in the past to vulcanize can now be easly vulcanized with the polymer of this invention.

By the use of a reactive adhesive agent such as epoxy resins for binding the polymers of this invention to each other or to another substance, better results can be obtained in bonding such polymers than can be obtained with the conventional fluoro-resins. The solvent resistance of the polymers of this invention varies depending on the kind of monomer or monomers employed in making the polymers and the degree of polymerization. For instance, among the 3-component copolymers, the 3-component copolymer consisting of tetrafluoroethylene, hexafluoropropylene and 3-butenoic acid ($CF_2=CFCF_2COOH$)

is insoluble in solvent, whereas by substituting the tetrafluoroethylene in such 3-component copolymer with vinylidine fluoride, the resulting terpolymer is soluble in acetone, ethylacetate etc. Even the solvent-soluble polymer, however, can be made insoluble in solvent by cross-linking.

Molding can be carried out with ease by utilizing the cross-linking reaction of the polymers of the invention. A suitable molding method should be selected according to the properties of the polymer to be used, not prejudicing the use of various molding methods known for thermoplastic resins.

In the case of a polymer in powder form, for instance, to a copolymer of tetrafluorethylene and a polyfluorocarboxylic acid in granular powder form the powder can be preformed by compression and then baked at a temperature which is higher than the melting point thereof. When a cross-linking agent is to be added, the above powder and the cross-linking agent can be thoroughly mixed in a blender or mixer, after which the admixture can be molded in like manner. A polymer in oily form can be mixed with said cross-linking agent to form a homogeneous composition after which the admixture can be cast into molds, and cross-linked at ambient temperatures or by being suitably heated. A polymer in rubbery form can be thoroughly mixed with a vulcanizing agent and a filler and heat-pressed into a shape. A polymer of high molecular weight can be molded by any of the usual molding methods used for a thermoplastic resin.

For a better understanding of the invention, preferred methods for synthesizing a monomeric unsaturated aliphatic polyfluorocarboxylic acid and a derivative thereof are given hereunder only to illustrate the invention and without limiting it.

METHOD 1

270.5 grams of $CF_2ClCFClCCl_3$ (1,2,3,3,3,-pentachloro - 1,1,2 - trifluoropropane), derived from chloroform and tetrafluoroethylene, 370 grams of 30% fuming sulfuric acid and 1 drop of mercury were reacted with stirring at 120° C. for 6 hours in a 500 ml. flask equipped with stirring blades, reflux cooler, dropping funnel and thermometer. The reaction mixture was then distilled, and 365 grams of distillate was obtained. The distillate was added dropwise to 300 ml. of methanol, with cooling and stirring, to which there was further added a two fold amount by volume of water for separation purposes. The heavier layer thereof was washed with the same volume of water to produce 203 grams of a substance which was confirmed by elementary analysis and infrared absorption spectrum to be $CF_2ClCFClCOOCH_3$ (methyl-1,2-dichloro-1,2,2-trifluoropropionate). The resultant product was then added dropwise at reflux temperatures into 500 ml. of acetone in which 78 grams of zinc dust was suspended, and was left for 6 hours' reaction time after which the top layer was removed and the remaining portion was diluted with a two fold amount by volume of water, then the lower layer was separated and further washed with the same volume of water and dried. By rectifying the resultant product, 91 grams of $CF_2=CFCOOCH_3$ (methylperfluoroacrylate)

was separated, the structure of which was confirmed by the characteristic absorption of a double-bond at 5.6μ and a carboxyl group at 5.7μ in infrared absorption spectrum, and also by elementary analysis.

To 30 grams of the resultant unsaturated ester there was added dropwise with stirring in 30 minutes, 45 cc. of a 20% aqueous solution of NaOH for hydrolysis and there were thereby obtained 24 grams of $CF_2=CFCOONa$ (sodium perfluoroacrylate, confirmed by infrared absorption spectrum of a double bond at 5.65μ and —COONa at 5.9μ), and 3.7 grams of granular high molecular weight substance.

Said high molecular weight substance was insoluble in water, and could not be decomposed even at 300° C. The infrared absorption spectra for this substance showed, besides the absorption of C—F bond at 8~9μ, the pronounced absorption of —COOH other than $CF_2=CFCOONa$ at 3μ and 6.0~6.2μ.

METHOD 2

In 1 liter flask there were placed 670 grams of 30% fuming sulfuric acid and 3 grams of mercury which were heated at 120° C., to which 641 grams of 1,2,4,4-pentachloro-1,1,2,3,3-pentafluorobutane was added dropwise in 1 hour and the whole system was left to react with stirring at 120° C. for 5 hours, and the reaction product was distilled and 820 grams of the distillate was obtained before sulfuric acid was distilled. The distillate was added dropwise to 500 ml. of methanol with stirring and cooling after which there was added a twofold amount by volume of water for separation purposes. The lower layer thereof was again washed with the same volume of water and dried with $MgSO_4$ and upon distillation thereof produced 512 grams of $CF_2ClCFClCF_2COOH_3$ (boiling point: 147° C./760 mm. Hg).

To 1,200 ml. of acetone there were added 170 grams of zinc dust and 1 gram of zinc chloride, and to this mixture there was added dropwise under reflux temperature and with stirring the resultant ester and it was left to react for 10 hours.

Zinc dust was removed from the reaction mixture by filtration and by then adding a two fold volume of water the ester layer was separated, washed with water, dried and distilled to produce 255 grams of $CF_2=CFCF_2COOCH_3$ (methylperfluoro-3-butenate, boiling point: 96° C./760 mm. Hg) and 102 grams of unreacted ester. To 30 grams of the reacted ester there was added a drop of phenolphthalein to which was added dropwise with cooling and stirring 32 ml. of a 20% aqueous solution of NaOH, and there were obtained 26 grams of $CF_2=CFCF_2COONa$ (sodium 3-butenate) and 1.5 grams of a polymer-like substance, and the latter showed pronounced absorption of —COOH group at 2.5~3.2μ and 5.9~6.2μ in infrared absorption spectrum, and was not decomposed or melted at 300° C., was insoluble in water and various organic solvents, and only somewhat soluble in dilute hydrochloric acid.

METHOD 3

100 grams of 1,2-dichloro-6-iodoperfluorohexane was oxidized with fuming sulfuric acid in a similar manner to Method 1, and the resultant acid fluoride was reacted with methanol to form an ester which was dechlorinated to produce 29 grams of $CF_2=CF(CF_2)_3COOH_3$ (methyl 5-hexenate, boiling point: 70~73° C./100 mm. Hg). By hydrolysis of the resulting product with a 20% aqueous solution of NaOH the Na-salt also was obtained easily.

Preferred examples for producing the polymers of the inventions are given hereinafter only to illustrate the invention without limiting it.

Example 1

2 grams of $CF_2=CFCF_2COONa$ (sodium 3-butenate) was dissolved in 10 ml. of deaerated pure water to which there was added ammonium persulfate and the admixture was then poured into an ampoule, the air space of which was then thoroughly replaced with $N_2$ and sealed, and the sealed ampoule was left at 80° C. for 12 hours in which time 0.3 gram of a polymer like substance, insoluble in water, was obtained. The solution turned slightly brownish. An infrared absorption spectrum test of the product, proved to be almost the same as the product obtained by the hydrolysis of the ester in Method 2, but it was insoluble in 2 N-diluted hydrochloric acid.

Example 2

By treating $CF_2=CFCF_3—COOCH_3$ of Method 3 with ammonium persulfate in a manner similar to that employed in Example 1, a polymer, insoluble in organic solvents and non-melting, was obtained.

Example 3

In a 3 liter autoclave equipped with a stirrer, there were placed 1 liter of demineralized pure water, 10 grams of the ammonium salt of ω-hydroperfluorononanoic acid and 10 grams of $CF_2=CFCF_2COONa$ as obtained by the process of Method 2, and after deaeration the mixture was put under a pressure of 10 kg./cm.² (gauge pressure) by introducing tetrafluoroethylene and heated to 60° C., then 15 mg. of ammonium persulfate dissolved in 50 ml. of pure water was added. When the pressure in the autoclave dropped 1 kg./cm.² after 10 minutes, tetrafluoroethylene was continuously introduced to maintain the pressure: 9~10 kg./cm.². After 1.5 hours tetrafluoroethylene was discharged from the autoclave and there remained an aqueous suspension, which was translucent and milky white in color.

To the resultant suspension there was added a half volume of acetone and the system was vigorously stirred with a domestic mixer to form a coagulate of a white polymer. The absorption of —COONa was observed at 5.9μ in the infrared absorption spectrum. A sample of the resultant polymer, molded at 350° C., exhibited a somewhat higher yield strength and lesser compression strain than tetrafluoroethylene homopolymer produced under the same conditions.

Example 4

To a 500 ml. stainless steel autoclave equipped with a stirrer and cooled with Dry Ice, there was successively added and frozen 300 mg. of potassium persulfate, 100 mg. of sodium sulfite, 10 mg. of ferrous sulfate, and 10 grams of $CF_2=CFCF_2COONa$ each dissolved in 50 ml. of deaerated pure water, and after evacuation of the free space of the autoclave there was added 110 grams of trifluorochloroethylene and the system was stirred at 30° C. for 5 hours. At the end of 5 hours the pressure had dropped from 6 kg./cm.² to 3 kg./cm.² and when the residual trifluorochloroethylene was discharged there had been produced an opaque milky white suspension which, after coagulation, washing with water and drying in a manner similar to that employed in Example 3, produced 93 grams of a polymer in white powder form. The NST (no-strength-temperature) of the polymer was 262° C. but when compared with trifluorochloroethylene homopolymer (NST: 260~270° C., obtained under the same conditions), tested at 300° C. for 1 hour in an air bath, the NST of said polymer rose as high as 310° C., while that of the trifluorochloroethylene homopolymer dropped to 240~250° C. A sheet prepared from the polymer and heat-treated exhibited more transparency and elasticity than that of a sheet prepared from trifluorochloroethylene homopolymer.

Example 5

To 50 grams of $CF_2=CFCOONa$ (sodium perfluoroacrylate) there was added 50 ml. of 50% sulfuric acid and it was dissolved under cooling after which the resulting reaction product was extracted continuously with diethylether. The diethylether was expelled from the extract on a hot bath, and 34 grams of $CF_2=CFCOOH$ was obtained. The product and an equivalent moles (26.7 grams) of trifluoronitrosomethane were cooled with liquid nitrogen and introduced into a glass pressure cylinder, evacuated and sealed, then returned to room temperature and after vigorous shaking the mixture was left at 30° C. for 62 hours. The blue color of trifluoronitrosomethane gradually disappeared, and after 3 days the color of the system turned slightly yellowish and a jelly-like polymer formed. Since the resultant polymer was soluble in trichlorotrifluoroethane but insoluble in methanol it was purified by reprecipitation with methanol to produce 30 grams or so of the pure polymer which had the form of raw rubber i.e., non-fluid and adhesive. The product was thoroughly mixed with 0.3 gram of hexamethylene diamine and 5 grams of zinc oxide in a mixer, and after 3 hours of treatment at 100° C., it exhibited a good rubber elasticity with slightly brownish color. This product was insoluble in trichlorotrifluoroethane.

Example 6

In a 3 liter stainless steel autoclave equipped with a stirrer there were placed 1 liter of deaerated pure water, 10 grams of ammonium salt of the ω-hydroperfluorononanoic acid and 10 grams of $CF_2CF(CF_2)_3COONa$ produced as in Method 3. The autoclave was sealed and the air in the head space was replaced with nitrogen after which 200 grams of hexafluoropropylene ($C_3F_6$) was forced in and the temperature was raised to 80° C., and the pressure was 13 kg./cm.$^2$. Then with stirring 0.5 gram of ammonium persulfate, dissolved in 50 ml. of pure water, was injected into the autoclave and interior pressure was increased to 17.5 kg./cm.$^2$ with tetrafluoroethylene at the same time. Soon the pressure started decreasing, so that an intermittent forceful injection of tetrafluoroethylene was continued for 4 hours to maintain the pressure range: 16.5~17.5 kg./cm.$^2$ until the total amount of reduced pressure reached 20 kg./cm.$^2$. Then all the gas was recovered from the autoclave and there was obtained a translucent milky white aqueous suspension. From the suspension there was obtained 150 grams or so of a polymer using the after-treatment employed in Example 3. The resultant polymer contained 26 weight percent of hexafluoropropylene which indicated a specific melt viscosity at 380° C. of $3.7 \times 10^5$ poise by measuring with "KOKA-SHIKI Flow Tester" (Shimazu Seisakusho, Ltd., Japan), by which the specific melt viscosity is determined by computation from the flow velocity of the polymer which is forced through an orifice, 0.0825″ dia. and 0.315″ long under a piston load of 500 grams. The infrared absorption spectrum of a film obtained by directly pressing the polymer in powder form indicated the absorption of the —COONa group at 3μ, 5.7μ and 5.9μ. The polymer was heated under vacuum at 350~380° C. for 1~3 hours whereby the specific melt viscosity of the polymer rose markedly higher at 380° C. than that of ordinary tetrafluoroethylenehexafluoropropylene copolymer and was found to produce a polymer that was almost non-flowing and comparable to polytetrafluoroethylene. Further the film of said copolymer can be bonded with epoxy resin adhesive to aluminum sheeting to produce an extremely hard bond having a peel strength of 1.8~2.3 kg./cm.$^2$ as against ordinary polymer.

Example 7

1.1 gram of  $CF_2=CFCF_2COOH$, obtained by the process of Example 5 from $CF_2=CFCF_2COONa$ which was produced by the process of Method 2, 25 grams of tetrafluoroethylene, and 30 grams of trifluoronitrosomethane were charged in a 100 ml. glass pressure cylinder which was cooled with liquid nitrogen, the free space was evacuated and the cylinder was sealed, then returned to room temperature and vigorously shaken after which it was left at 30° C. for 3 days. Thus was obtained a substance, jelly-like, colorless and adhesive, having a similar appearance to the substance produced in Example 5. The performance of the product with respect to solvent-solubility and vulcanizing reactivity was perfectly similar to that of the polymer produced in Example 5.

Example 8

To a 500 ml. stainless steel autoclave equipped with a stirrer and cooled with dry ice, there was successively added and frozen 1,500 mg. of potassium persulfate, 250 mg. of sodium bi-sulfate, 250 mg. of ferrous sulfate, 2.5 grams of $H(C_2F_4)_4COONH_4$ and 2.5 grams of $$CF_2=CF(CF_2)_3COONa$$

each dissolved in 50 ml. of deaerated pure water.

The autoclave was then evacuated and further charged with 95 grams of a mixture of vinylidene fluoride and trifluorochloroethylene in an equivalent molar ratio, and the mixture was reacted for 30 hours with shaking at 40° C. After recovering unreacted monomer, an aqueous suspension, milky white in color, was obtained. To the suspension was added 50 ml. of a 10% aqueous solution of calcium chloride to the system and was vigorously stirred in a mixer to coagulate a viscous polymer which accumulated on the mixer blades. The polymer was washed with methanol and dried to provide 84 grams of a soft flaky polymer, which was soluble in methyl ethyl ketone, and had some rubberlike elasticity which was further improved by vulcanizing the polymer in the manner disclosed in Example 5, and the solvent resistance of the polymer was also thereby improved to the extent of providing a crosslinked polymer which was only slightly soluble in methyl ethyl ketone.

We claim:

1. A fluorine-containing polymer of at least one compound having the structure:

$$CF_2=CF(CF_2)_nA$$

wherein $n$ is an integer of 1 to 16 inclusive, and A is a member selected from the group consisting of COOH, COOM, COOR, COOR$_f$, CONH$_2$ and CN, wherein M is alkali metal or alkaline earth metal, R is an alkyl group of 1 to 3 carbon atoms, and R$_f$ is a fluorine containing alkyl group of 1 to 3 carbon atoms.

2. A fluorine-containing polymer as in claim 1 which is a copolymer of at least one compound having the structure $CF_2=CF(CF_2)_nA$, and at least one compound selected from the group consisting of tetrafluoroethylene, trifluoromonochlorethylene, trifluoroethylene, vinylidine fluoride, 1,1-difluoro-2,2-dichloroethylene, 1,1-difluoro-2-chloroethylene, hexafluoropropylene, 1,1,1,3,3-pentafluoropropylene, octafluoroisobutylene, ethylene, vinyl chloride, trifluoronitrosomethane, perfluoronitrosoethane, an alkyl vinyl ether, and an unsaturated epoxide.

3. A fluorine-containing polymer as in claim 2 which is a copolymer of $CF_2=CF(CF_2)_nCOOH$.

4. A fluorine-containing polymer according to claim 1 wherein $n$ is an integer of 1 to 3 inclusive.

5. A fluorine-containing polymer as in claim 2 which is a copolymer of a compound having the structure $$CF_2=CF(CF_2)_nCOOM$$

6. A fluorine-containing polymer as in claim 5 wherein M is Na.

7. A fluorine-containing polymer as in claim 4 which is a copolymer of $CF_2=CFCF_2COONa$.

8. A fluorine-containing polymer as in claim 4 which is a copolymer of $CF_2=CF(CF_2)_3COONa$.

9. A fluorine-containing polymer as in claim 4 which is a copolymer of $CF_2=CFCF_2COOH$, tetrafluoroethylene and trifluoronitrosomethane.

10. A fluorine-containing polymer as in claim 4 which is a copolymer of $CF_2=CFCF_2COONa$ and tetrafluoroethylene.

11. A fluorine-containing polymer as in claim 4 which is a copolymer of $CF_2=CFCF_2COONa$ and trifluoroethylene.

12. A fluorine-containing polymer as in claim 4 which is a copolymer of  $CF_2=CF(CF_2)_3COONa$ and hexafluoropropylene.

13. A fluorine-containing polymer as in claim 4 which is a copolymer of $CF_2=CF(CF_2)_3COONa$, vinylidene fluoride and trifluoromonochloroethylene.

14. A fluorine-containing polymer as in claim 1 which is a homopolymer.

15. A fluorine-containing polymer as in claim 14 which is a homopolymer of a compound having the structure $$CF_2=CF(CF_2)_nCOOM$$

16. A fluorine-containing polymer as in claim 4 which is a homopolymer of $CF_2=CFCF_2COONa$.

17. A fluorine-containing polymer as in claim 4 which is a copolymer of $CF_2=CFCF_2COOH$.

References Cited

UNITED STATES PATENTS

| | | | |
|---|---|---|---|
| 2,795,601 | 6/1957 | Rendall et al. | 260—486 |
| 2,833,831 | 5/1958 | Haszeldine | 260—485 F |
| 3,366,610 | 1/1968 | Anderson | 260—88.3 A |
| 3,506,635 | 4/1970 | Anderson | 260—88.3 A |
| 3,366,610 | 1/1968 | Anderson | 260—88.3 A |

HARRY WONG, JR., Primary Examiner

U.S. Cl. X.R.

204—159.22; 260—80.3, 85.5, 86.1, 86.3, 86.7, 87.5, 87.7, 88.1, 88.7, 89.5, 89.7, 92.1, 465.7, 486, 539, 561, 900